April 4, 1961 J. V. PENNINGTON 2,977,977
VALVE
Filed Nov. 3, 1958 3 Sheets-Sheet 1
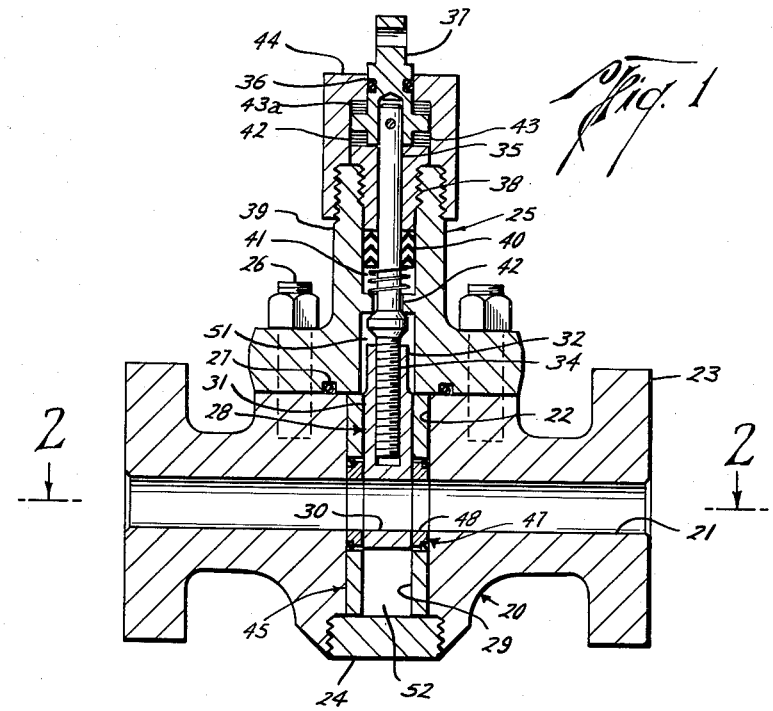
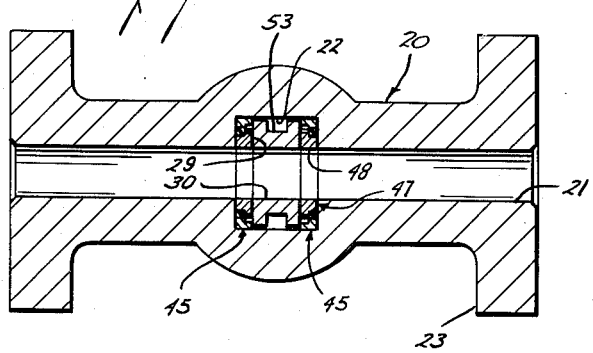
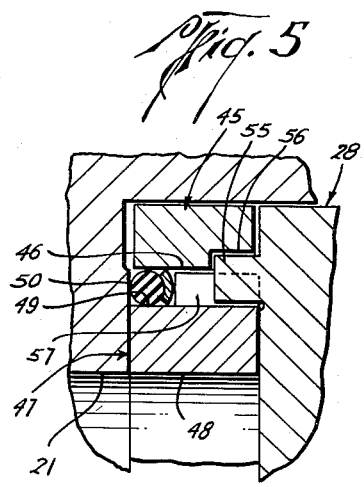
John V. Pennington
INVENTOR.
BY Browning, Simms, Hyer & Eickenroht
ATTORNEYS April 4, 1961

J. V. PENNINGTON 2,977,977

VALVE

Filed Nov. 3, 1958

John V. Pennington
INVENTOR.

BY Browning, Simms, Hyer & Eickenroht
ATTORNEYS

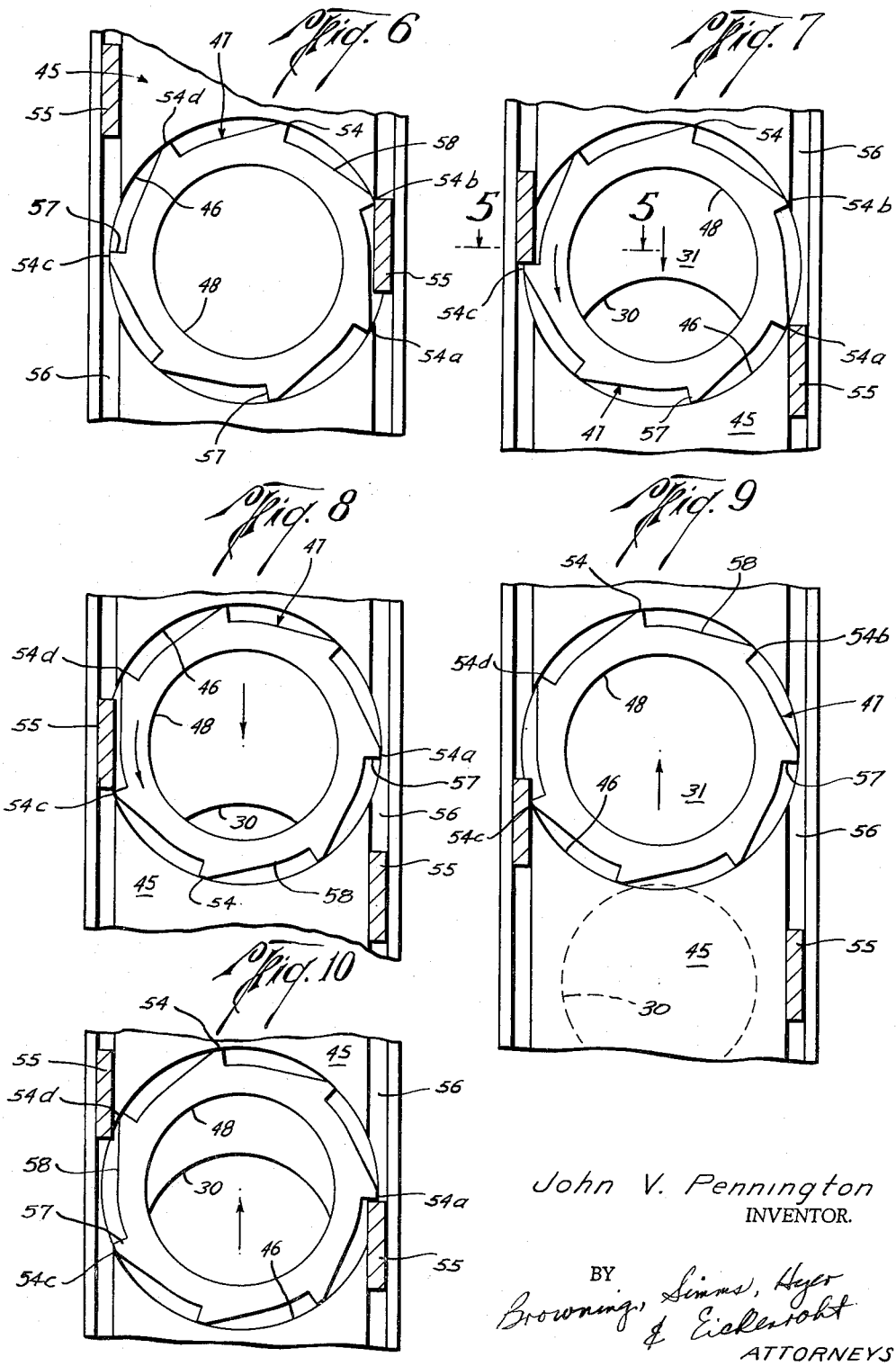

United States Patent Office 2,977,977
Patented Apr. 4, 1961

2,977,977
VALVE

John V. Pennington, Whittier, Calif., assignor to Cameron Iron Works, Inc., Houston, Tex.

Filed Nov. 3, 1958, Ser. No. 771,593

7 Claims. (Cl. 137—330)

This invention relates broadly to valves; and, more particularly, to improvements in valves of the type disclosed in a copending application, Serial No. 659,199, filed by Herbert Allen on May 6, 1957, and assigned to the assignee of the present application, wherein a seat element is caused to rotate about its opening to distribute the wear about its edge.

In the aforementioned earlier valve, rotation is imparted to the seat element by means which is responsive to opening and closing of the valve member and which includes parts dependent for their operation upon a frictional force-transmitting connection. However, it has been found that when gritty substances are present in the fluid controlled by the valve, they may find their way between such parts so as to permit them to slip relative to one another and thereby fail to rotate the seat element.

In order to overcome this latter problem, it subsequently has been proposed to impart the desired rotation to the seat element in a more positive manner by means of parts on the valve member for engaging and following teeth about the seat element during movement of the valve member between opened and closed positions, to rotate the seat element in the manner mentioned. However, such parts have comprised pivotally mounted dogs or other moving parts which are themselves susceptible of being immobilized by sanding up.

An object of this invention is to provide a valve of this general type which obviates each of the aforementioned difficulties.

A more particular object is to provide such a valve in which the parts for rotating the seat element are dependent on neither a frictional force-transmitting connection nor relative movement with respect to the valve member.

Another object is to provide a valve for accomplishing the above-described objects which is of simplified construction and operation.

These and other objects are accomplished by a valve which includes, as in the valve of the aforementioned earlier invention, a body having a flowway therethrough and a cavity therein intersecting the flowway. A valve member is mounted on the body for movement within the cavity between flowway opening and closing positions, and a seat element having an opening therethrough is carried within the body for rotation about its opening to a plurality of rotational positions for sealing between the valve member in its closed position and a surface on the body which surrounds the flowway at its intersection with the cavity.

In accordance with the present invention, the valve member and seat element are provided with parts fixed thereto for engagement with one another to rotate the seat element between different rotational positions during movement of the valve member between opened and closed positions. More particularly, the seat element is provided with teeth therabout and pins are fixed to the valve member to engage and follow teeth on the seat element to rotate it in the manner described.

In the preferred form of the invention, there are a pair of such pins, one engaging and following a tooth to rotate the seat element from one rotational position to another during opening movement of the valve member, and the other engaging and following another tooth to rotate the seat element from said other to still another rotational position during closing movement of the valve member. More particularly, each pin engages and follows a tooth on one side of the seat element, during movement of the valve member in one direction, to rotate same and dispose a tooth on the other side thereof in position to be engaged and followed by the other pin, during movement of the valve member in the opposite direction, to rotate the seat element from said other to still another rotational position.

Thus, the pins are fixed to the valve member in spaced apart relation laterally of the direction of movement of the valve member, and each pin leads the other during movement of the valve member in one direction, to clear the tooth which it engages and follows during movement of the valve member in the opposite direction. Preferably, each of the pins engages and follows a tooth to rotate the seat element while the valve member is positioned to at least partially open the flowway. In this manner, there is considerably less resistance to turning of the seat element due to restriction of the flowway than there would be if the valve member were closed. The teeth are odd in number and disposed in equally spaced apart relation upon the periphery of the seat element, and the pins fixed to the valve member move within grooves in the body which extend longitudinally and are spaced apart laterally of the direction of movement of the valve member at opposite sides of the seat element.

In the drawings, wherein like reference characters are used throughout to designate like parts:

Fig. 1 is a vertical sectional view of a gate valve constructed in accordance with the present invention and with the gate in open position;

Fig. 2 is a horizontal sectional view of the gate valve of Fig. 1, taken substantially along broken line 2—2 of Fig. 1;

Fig. 5 is an enlarged detailed sectional view, taken substantially along broken line 5—5 of Fig. 7, showing the engagement of a pin on the gate with a tooth on the seat element; and Figs. 6 to 10 are elevational views, taken along the plane of the inner surface of one of the seat elements, and illustrating the sequential cooperation of the pins and teeth on the seat element during opening and closing movement of the gate.

Figure 3:
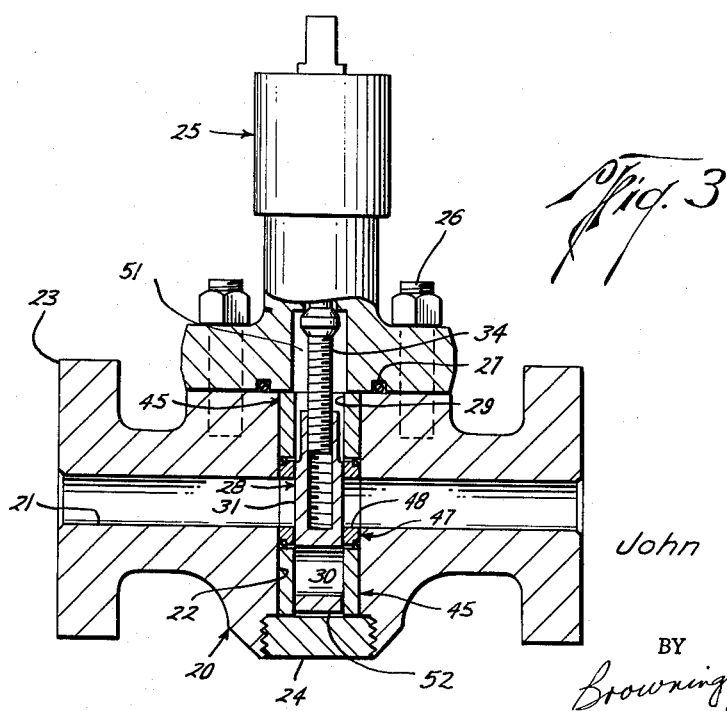
Fig. 3 is a view similar to Fig. 1, but with the gate in closed position.

Referring now more particularly to the above-described drawings, the gate valve shown in Figs. 1 to 3 includes a body 20 having a flowway 21 therethrough and a cavity 22 therein intersecting the flowway. The ends of the body 20 are provided with flanges 23 or other suitable means for connection in a pipe line. The cavity 22 is closed at its lower end by a plug or plate 24 and opens at its other end to one side of the valve body. This opening is covered by a bonnet 25 which is removably connected to the body by means of bolts 26 or the like and sealed with respect thereto by means of an O-ring 27.

As is customary in gate valves, the bonnet 25 supports a gate or valve member 28 for movement within a guideway 29 in the cavity 22 between the flowway opening position of Fig. 1 and the flowway closing position of Fig.

3. For this purpose, the gate 28 is provided with an opening 30 therethrough alignable with the flowway 21 in the open position of the gate, and a solid imperforate portion 31 which is disposable across the flowway as the opening 30 is moved out of alignment therewith upon movement of the gate to closed position.

Figure 4:
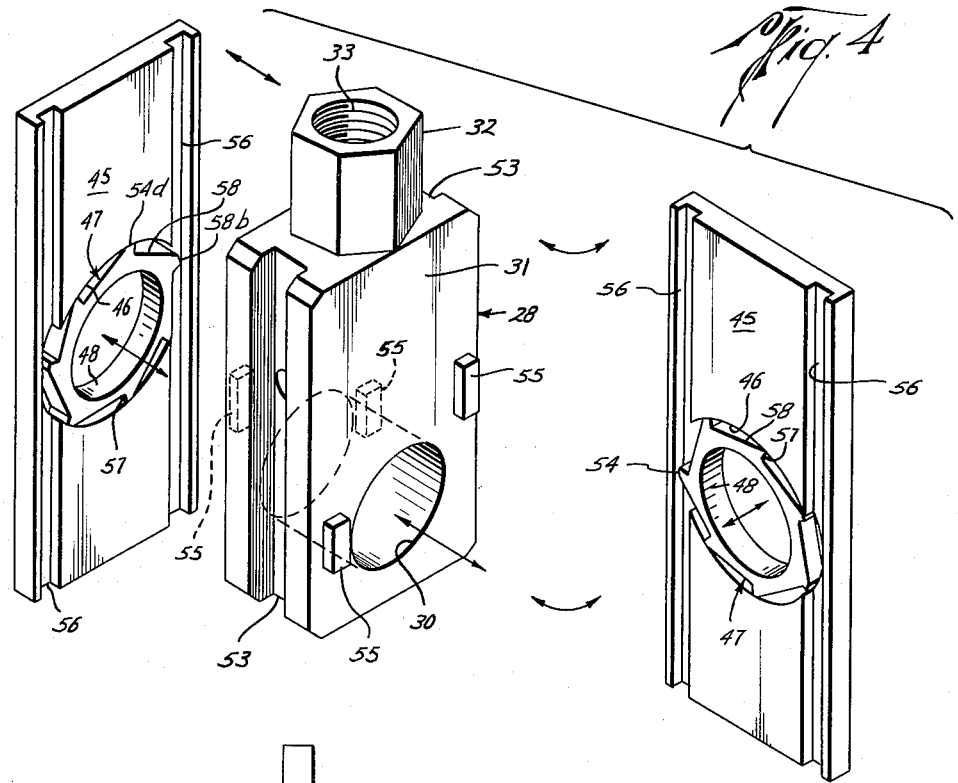
Fig. 4 is an enlarged exploded view of the removable gate and seat assembly of the valve of Figs. 1 to 3.

As shown in Figs. 1, 3 and 4, the upper end of the gate 28 is provided with a collar 32 having an internally threaded opening 33 for connection to the lower threaded end 34 of a stem 35. The stem is pinned at its upper end to an extension 36 having a part 37 projecting outwardly from the top of the bonnet 25 to enable rotation of the stem. More particularly, the extension 36 is fixed against vertical movement within the bonnet so as to be non-rising and thereby cause the gate to move vertically within the guideway 29 in response to rotation of the stem and extension.

With particular reference to Fig. 1, the stem extension 36 is supported upon a bushing 38 threadedly received within the lower body portion 39 of the bonnet and resting upon a shoulder thereof. Packing 40 is received about the stem beneath the lower end of bushing 38 and urged into sealing engagement between the stem and body 39 by a compression spring 41 supported upon a reduced diameter portion 42 of the body. Bearings 43 and 43a are received about the stem extension above the bushing 38 and beneath the top of a cap 44 of the bonnet threadedly connected to the body portion 39 thereof. It is apparent from the foregoing that stem packing 40 may be replaced upon removal of the cap 44 and bushing 38.

Referring now to the replaceable gate and seat assembly, a pair of plates 45 are disposed within the body cavity 22 on opposite sides of the gate 28 so that their inner surfaces define the guideway 29 within which the gate is movable. Each such plate is provided with an opening 46 therethrough to receive an annular seat element 47, and each of the seat elements is, in turn, provided with an opening 48 therethrough for alignment with the flowway 21 through the valve body. The retainer plates are located by engagement at their upper ends with the lower side of bonnet 25 so as to align the openings 48 aligned with the flowway 21, as shown. Upon removal of the bonnet 25, the retainer plates may also be removed with the gate to permit replacement of the seat element 47, if desired.

The outer surface of each seat element 47 is provided with a recess 49 (see Fig. 5) to receive an O-ring 50 for sealing engagement with a surface on the valve body which surrounds the intersection of the recess and the flowway 21 with an adjacent side of the cavity. More particularly, the seat element is slightly thicker than the retainer plate 45 in which it is carried, so that as the gate moves to the closed position of Fig. 3, upstream pressure will act against the solid imperforate portion 31 of the gate to urge it tightly against the seat element and the seat element tightly against the aforementioned surface on the downstream side of the body cavity. In this manner, the seat element seals between the downstream side of the gate and such surface.

It is also apparent from Figs. 1 and 3 that the upper and lower ends of the gate 28 define chambers 51 and 52, respectively, within the valve body and bonnet for receiving grease or other lubricant to facilitate movement of the gate. As shown in Figs. 2 and 4, the opposite side edges of the gate are provided with grooves 53 for circulating the grease from one chamber to the other during reciprocation of the gate.

Turning now particularly to the novel features of the present invention, the outer periphery of each of the seat elements 47 is provided with an odd number of equally spaced apart ratchet-type teeth 54 which fit relatively closely within the opening 46 in the retainer plates 45. As more fully explained in the aforementioned copending application, rotation of the seat element within this opening serves to distribute the wear upon the lower inside edge of the downstream seat element and thereby prolongs its useful life. A pair of pins 55 are fixed on each side of the gate 28 in spaced apart relation laterally of the direction of movement of the gate to engage and follow the teeth on the seat element during reciprocation of the gate, in a manner fully described below. More particularly, the pins 55 are spaced apart longitudinally of the direction of movement of the gate and the leftmost pin, as seen in Figs. 6 to 10, is disposed above the rightmost pin so that the leftmost pin leads during opening movement of the gate and the rightmost pin leads during closing movement of the gate.

The inner surface of each of the retainer plates 45 is provided with a pair of longitudinally extending grooves 56 each for receiving one of the pins 55 during reciprocation of the gate. The upper ends of these grooves intersect the opening 46 in the retainer plate within which the seat element rotates at opposite sides of the seat element. More particularly, each tooth of the seat element has a substantially radially extending surface 57 which is disposable across a groove 56 on one side of the seat element to be engaged and followed by the pin 55 movable therein during movement of the gate in one direction. The seat element is thus rotated through an angle equal to approximately one-half the angle transcribed by each tooth so as to dispose a similar surface of another tooth across the groove on the other side of the seat element to be engaged and followed by the other pin, during movement of the gate in the opposite direction, for rotating the seat element a substantially equal amount. The surfaces on the periphery of the seat element connecting the inner edge of the radially extending surface of each tooth with the outer edge of the radially extending surface of a following tooth are tapered at 58 to permit movement of the leading pin therepast prior to engagement of the following pin with the tooth on the other side of the seat element.

Thus, with reference to Figs. 6 to 10, it will be seen that as the gate moves downwardly from the fully open position of Fig. 6 to the position of Fig. 7, the leading rightmost pin 55 will move past the tapered periphery 58 connecting tooth 54a with tooth 54b on the right side of the seat element prior to engagement of the following leftmost pin with the radially extending surface 57 of tooth 54c on the left side of the seat element. As the gate continues to move toward closed position from the position of Fig. 7 to that of Fig. 8, the leftmost pin will follow tooth 54c to rotate the seat element in a counterclockwise direction from the rotational position of Figs. 6 and 7 to that of Fig. 8 and dispose the radially extending surface 57 of tooth 54a across the rightmost groove 56. At the same time, it will be seen from Fig. 8 that the tooth 54c as well as the succeeding tooth 54d are removed from the leftmost groove 56, so that they may be cleared by the leftmost pin 55.

As the gate continues to move toward closed position, the leftmost pin 55 will move downwardly past the seat element so as to dispose the imperforate surface 31 of the gate across the flowway, as shown in Fig. 9. When the gate is moved in the opposite direction so as to reopen the valve, the leftmost pin 55 will again move past the teeth 54c and 54d prior to engagement of the rightmost pin 55 with the tooth 54a. Thus, during the final opening movement of the gate from the position of Fig. 10 to that of Fig. 6, the rightmost pin 55 will engage and follow the tooth 54a to rotate the seat element from the rotational position of Figs. 8, 9 and 10 to still another rotational position, again through an angle approximately equal to one-half of the angle transcribed by each tooth. This rotation will also dispose the radially extending surface of tooth 54d across the leftmost groove 56 in position to be engaged and followed by the leftmost pin 55 upon subsequent closing movement of the gate. Thus, during a complete cycle of opening and closing movement of the gate, the seat element is rotated through an angle approximately equal to the angle transcribed by each tooth.

Preferably, the pins 55 are fixed to the gate 28 so that each of the pins engages and follows a tooth to rotate the seat element while the gate is positioned to at least partially open the flowway. Attention, in this respect, is invited to Figs. 7 and 10. As previously described, this reduces the resistance to rotation of the seat element due to choking down of the flowway. As best shown in Fig. 4, the pins 55 are fixed to the gate with one substantially laterally adjacent the opening through the gate and the other disposed just longitudinally thereabove.

The pins 55 and the teeth on the seat element are so arranged relative to one another as to prevent retrogressive movement and consequent jamming of the seat element, which might otherwise occur due to vibration or other cause. Thus, with reference to each of Figs. 6 and 9, wherein the gate is shown in the limits of its opened and closed positions, it will be seen that the rightmost pin 55 is opposite tooth 54b and the leftmost tooth is opposite tooth 54c, thereby in each case preventing clockwise rotation of the seat element. If, on the other hand, the rightmost pin were to move above and free of the tooth 54b, and a slight clockwise rotation of the seat element were to occur, both of the teeth 54b and 54c could be engaged by the pins upon downward closing movement of the gate. Of course, a similar condition might occur if the leftmost pin 55 were to move down past the tooth 54c.

The provision of the teeth on the outer periphery of the seat element and guided movement of the pins on the gate within grooves in the retainer plates enable such retainer plates to be of minimum thickness. Furthermore, the disposal of the seat elements and pins for rotating same on both sides of the gate enables the gate to control flow in either direction since, in either case, it will cause the seat element on the downstream side of the gate to be rotated for distributing wear thereabout.

Although the illustrative embodiment of this invention is a gate valve, it is to be understood that its novel concepts are also applicable to other types of valves.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough and a cavity therein intersecting the flowway, a valve member mounted on the body for movement within the cavity between positions opening and closing the flowway, a seat element having an opening therethrough and carried within the body for rotating about its opening, fixed parts on the valve member and seat element engageable with one another to rotate the seat element about its opening, during movement of the valve member between opened and closed positions, from one predetermined seated position to another between the valve member in its closed position and a surface on the body which surrounds the flowway at its intersection with the cavity.

2. A valve, comprising a body having a flowway therethrough and a cavity therein intersecting the flowway, a valve member mounted on the body for movement within the cavity between positions opening and closing the flowway, a seat element having an opening therethrough and carried within the body for rotating about its opening, teeth about the seat element, and pins fixed to the valve member for engaging and following teeth on the seat element to rotate the seat element about its opening, in response to opening and closing movement of the valve member, from one predetermined seated position to another between the valve member in its closed position and a surface on the body which surrounds the flowway at its intersection with the cavity.

3. A valve, comprising a body having a flowway therethrough and a cavity therein intersecting the flowway, a valve member mounted on the body for movement within the cavity to open and close the flowway, a seat element having an opening therethrough and carried within the body for rotation about its opening to a plurality of rotational positions for seating between the valve member in its closed position and a surface on the valve body which surrounds the flowway at its intersection with the cavity, teeth about the seat element, and a pair of pins fixed to the valve member, one of said pins engaging and following a tooth to rotate the seat element from one predetermined seating position to another during opening movement of the valve member, and the other pin engaging and following another tooth to rotate the seat element from said other to still another predetermined seating position during closing movement of the valve member.

4. A valve, comprising a body having a flowway therethrough and a cavity therein intersecting the flowway, a valve member mounted on the body for movement in opposite directions within the cavity between positions opening and closing the flowway, a seat element having an opening therethrough and carried within the body for rotation about its opening to a plurality of rotational positions for seating between the valve member in its closed position and a surface on the valve body which surrounds the flowway at its intersection with the cavity, teeth about the seat element, and a pair of pins fixed to the valve member each for engaging and following a tooth on one side of the seat element, during movement of the valve member in one direction, to rotate the seat element from one predetermined seating position to another and dispose a tooth on the other side thereof in position to be engaged and followed by the other pin, during movement of the valve member in the opposite direction, to rotate the seat element from said other to still another predetermined seating position.

5. A valve, comprising a body having a flowway therethrough and a cavity therein intersecting the flowway, a valve member mounted on the body for movement in opposite directions within the cavity between positions opening and closing the flowway, a seat element having an opening therethrough and carried within the body for rotation about its opening to a plurality of rotational positions for seating between the valve member in its closed position and a surface on the valve body which surrounds the flowway at its intersection with the cavity, teeth about the seat element, and a pair of pins fixed to the valve member in spaced apart relation laterally of the direction of movement of the valve member, one pin engaging and following a tooth on one side of the seat element, during movement of the valve member toward closed position, to rotate the seat element from one predetermined seating position to another and dispose another tooth in position on the other side of the seat element to be engaged and followed by the other pin, during movement of the valve member toward opened position, for rotating the seat element from said other to still another predetermined seating position, each pin leading the other, during movement of the valve member in one direction, to clear the tooth which it engages and follows during movement of the valve member in the opposite direction.

6. A valve of the character defined in claim 5, wherein each of said pins engages and follows a tooth to rotate the seat element while the gate is positioned to at least partially open the flowway.

7. A valve, comprising a body having a flowway therethrough and a cavity therein intersecting the flowway, a valve member mounted on the body for movement in opposite directions within the cavity between positions opening and closing the flowway, a seat element having an opening therethrough and carried within the body for rotation about its opening to a plurality of rotational positions for seating between the valve member in its closed position and a surface on the valve body which surrounds the flowway at its intersection with the cavity, an odd number of teeth on the periphery of the seat element, a pair of grooves in the body extending longitudinally and spaced apart laterally of the direction of movement of the valve member at opposite sides of the seat element, and a pair of pins fixed to the valve member each movable within a groove, each tooth on the seat element having a substantially radially extending surface disposable across a groove at one side of the seat element to be engaged and followed by the pin movable therein, during movement of the valve member in one direction, for rotating the seat element from one predetermined seating position to another and disposing a similar surface of another tooth across the groove on the other side of the seat element to be engaged and followed by the other pin, during movement of the valve member in the opposite direction, for rotating the seat element from said other to still another predetermined seating position, and the surfaces on the periphery of the seat element connecting the inner edge of the radially extending surface of each tooth with the outer edge of the radially extending surface of a following tooth being tapered to permit the leading pin to move past the tooth, during movement of the valve member in the opposite direction.

References Cited in the file of this patent

UNITED STATES PATENTS

| | | |
|---|---|---|
| 851,161 | Churchill | Apr. 23, 1907 |
| 2,230,600 | Olson | Feb. 4, 1941 |
| 2,854,209 | Erwin | Sept. 30, 1958 |
| 2,907,342 | Berg | Oct. 6, 1959 |